(12) United States Patent
Scherz et al.

(10) Patent No.: US 11,435,437 B2
(45) Date of Patent: Sep. 6, 2022

(54) APPARATUS AND METHOD FOR TRANSMITTING AN RF SIGNAL

(71) Applicant: Infineon Technologies AG, Neubiberg (DE)

(72) Inventors: Philipp Scherz, Linz (AT); Markus Josef Lang, Pfarrkirchen (AT); Roland Vuketich, Arbing (AT)

(73) Assignee: Infineon Technologies AG

( * ) Notice: Subject to any disclaimer, the term of this patent is extended or adjusted under 35 U.S.C. 154(b) by 302 days.

(21) Appl. No.: 16/719,119

(22) Filed: Dec. 18, 2019

(65) Prior Publication Data
US 2020/0217923 A1 Jul. 9, 2020

(30) Foreign Application Priority Data

Jan. 4, 2019 (DE) .................... 102019100128.5

(51) Int. Cl.
*G01S 7/03* (2006.01)
*G01S 13/931* (2020.01)
*H01Q 1/32* (2006.01)
*H01Q 3/36* (2006.01)

(52) U.S. Cl.
CPC .......... *G01S 7/032* (2013.01); *G01S 13/931* (2013.01); *H01Q 1/3233* (2013.01); *H01Q 3/36* (2013.01)

(58) Field of Classification Search
CPC ........ G01S 7/032; G01S 13/931; G01S 13/42; G01S 7/4056; H01Q 1/3233; H01Q 3/36; H03H 7/18; H04B 7/0413; H04L 27/00
See application file for complete search history.

(56) References Cited

U.S. PATENT DOCUMENTS

| 7,482,972 | B2 | 1/2009 | Forstner et al. |
| 8,416,033 | B2 | 4/2013 | Itoh et al. |
| 11,054,516 | B2* | 7/2021 | Wu ........................ G01S 13/878 |
| 2011/0140802 | A1* | 6/2011 | Pruvost .................. H01P 5/225 333/100 |
| 2011/0201283 | A1 | 8/2011 | Lorenz et al. |

FOREIGN PATENT DOCUMENTS

| DE | 3725066 A1 | 2/1997 |
| DE | 102006024458 A1 | 12/2007 |

* cited by examiner

*Primary Examiner* — Vladimir Magloire
*Assistant Examiner* — Yonghong Li
(74) *Attorney, Agent, or Firm* — Design IP

(57) ABSTRACT

The present disclosure relates to a transmission apparatus, including at least one first RF signal connection for an RF signal having a first phase, a ring coupler having a plurality of antenna connections for coupling a plurality of antennas in the first RF signal connection, wherein the ring coupler is configured to cause, at each of different antenna connections of the ring coupler, a constructive superposition of components of the RF signal that propagate from the first RF signal connection to the respective antenna connections in different directions in the ring coupler, wherein RF signals having different phases are obtained at the different antenna connections.

14 Claims, 5 Drawing Sheets

| Phase of the MMIC RF pins | | MIMO phase of antennas $Tx_{1-4}$ | | | | e.g. BPSK MIMO code of antennas $Tx_{1-4}$ | | | | |
|---|---|---|---|---|---|---|---|---|---|---|
| Phase $RF_{OUT1}$ $\varphi_1$ | Phase $RF_{OUT2}$ $\varphi_2$ | Phase $Tx_1$ | Phase $Tx_2$ | Phase $Tx_3$ | Phase $Tx_4$ | Code $Tx_1$ | Code $Tx_2$ | Code $Tx_3$ | Code $Tx_4$ | |
| 0 | - | $\pi/2$ | - | $-\pi/2$ | - | 1 | - | 0 | - | ← |
| $\pi/2$ | - | $\pi$ | - | 0 | - | | | | | |
| $\pi$ | - | $-\pi/2$ | - | $\pi/2$ | - | 0 | - | 1 | - | ← |
| $-\pi/2$ | - | 0 | - | $\pi$ | - | | | | | |
| - | 0 | - | $-\pi/2$ | - | $\pi/2$ | - | 0 | - | 1 | ← |
| 0 | 0 | $\pi/2$ | $-\pi/2$ | $-\pi/2$ | $\pi/2$ | 1 | 0 | 0 | 1 | ← |
| $\pi/2$ | 0 | $\pi$ | $-\pi/2$ | 0 | $\pi/2$ | | | | | |
| $\pi$ | 0 | $-\pi/2$ | $-\pi/2$ | $\pi/2$ | $\pi/2$ | 0 | 0 | 1 | 1 | ← |
| $-\pi/2$ | 0 | 0 | $-\pi/2$ | $\pi$ | $\pi/2$ | | | | | |
| - | $\pi/2$ | - | 0 | - | $\pi$ | | | | | |
| 0 | $\pi/2$ | $\pi/2$ | 0 | $-\pi/2$ | $\pi$ | | | | | |
| $\pi/2$ | $\pi/2$ | $\pi$ | 0 | 0 | $\pi$ | | | | | |
| $\pi$ | $\pi/2$ | $-\pi/2$ | 0 | $\pi/2$ | $\pi$ | | | | | |
| $-\pi/2$ | $\pi/2$ | 0 | 0 | $\pi$ | $\pi$ | | | | | |
| - | $\pi$ | - | $\pi/2$ | - | $-\pi/2$ | - | 1 | - | 0 | ← |
| 0 | $\pi$ | $\pi/2$ | $\pi/2$ | $-\pi/2$ | $-\pi/2$ | 1 | 1 | 0 | 0 | ← |
| $\pi/2$ | $\pi$ | $\pi$ | $\pi/2$ | 0 | $-\pi/2$ | | | | | |
| $\pi$ | $\pi$ | $-\pi/2$ | $\pi/2$ | $\pi/2$ | $-\pi/2$ | 0 | 1 | 1 | 0 | ← |
| $-\pi/2$ | $\pi$ | 0 | $\pi/2$ | $\pi$ | $-\pi/2$ | | | | | |
| - | $-\pi/2$ | - | $\pi$ | - | 0 | | | | | |
| 0 | $-\pi/2$ | $\pi/2$ | $\pi$ | $-\pi/2$ | 0 | | | | | |
| $\pi/2$ | $-\pi/2$ | $\pi$ | $\pi$ | 0 | 0 | | | | | |
| $\pi$ | $-\pi/2$ | $-\pi/2$ | $\pi$ | $\pi/2$ | 0 | | | | | |
| $-\pi/2$ | $-\pi/2$ | 0 | $\pi$ | $\pi$ | 0 | | | | | |

Fig. 3

APPARATUS AND METHOD FOR TRANSMITTING AN RF SIGNAL

FIELD

The present disclosure relates generally to apparatuses and methods for transmitting radio frequency (RF) signals and in particular to Multiple-Input Multiple-Output (MIMO) transceivers and MIMO radar systems.

BACKGROUND

An angular resolution of antenna systems is definitively dependent on the size of the (virtual) antenna aperture. In a MIMO (Multiple-Input Multiple-Output) system, transmission signals from different transmitters can be different. This allows echo signals to be reassigned to the source, resulting in an enlarged virtual reception aperture.

A MIMO radar system can allow the transmission of reciprocally orthogonal signals from each transmission antenna, and these waveforms can be extracted from each of the reception antennas by a set of adapted filters. If a MIMO radar system has three transmission antennas and four reception antennas, for example, the orthogonality of the transmitted signals means that twelve signals can be extracted from the receiver. That is to say that a twelve-element virtual antenna arrangement can be produced using only seven physical antennas by virtue of digital signal processing being performed on the received signals, which allows a finer spatial resolution to be achieved.

In the case of the conventional automotive radar sensors, as large an antenna aperture as possible is resolved by means of the MIMO technique using as many MIMIC (Monolithic Microwave Integrated Circuit) transmitter/receiver pins as possible, for example three transmitter and four receiver Pins. Such a configuration allows for example an antenna aperture of 12 virtual elements (=3×4) to be produced. In order to achieve even higher angular resolution, the number of transmitters and receivers can be increased, for example by cascading multiple MIMIC chips. However, a higher number of RF channels means higher costs for the required hardware and, specifically in the automotive sector, is a great disadvantage owing to the enormous numbers of pieces.

There is therefore a need to lower costs for MIMO systems.

SUMMARY

This need is met by methods and apparatuses in accordance with the independent claims. Advantageous developments are the subject matter of the dependent claims.

In accordance with a first aspect of the present disclosure, a transmission apparatus is provided. The transmission apparatus includes at least one first RF signal connection for a first RF signal. Further, the transmission apparatus includes a ring coupler having a plurality of antenna connections for coupling a plurality of antennas to the first RF signal connection. In this case, the ring coupler is designed to cause, at each of different antenna connections of the ring coupler, a superposition of components of the first RF signal that propagate from the first RF signal connection to the respective antenna connections in different directions (e.g. clockwise, anticlockwise) in the ring coupler. In accordance with some exemplary embodiments, the superposition can be a constructive superposition. The line lengths between the connections of the ring coupler are chosen such that RF transmission signals having different phases are obtained at the different antenna connections. As such, just one RF signal connection (e.g. MMIC RF pin) for multiple antennas can be used to generate RF transmission signals having different phases, which can then be distinguished by a receiver. This can be advantageous for MIMO radar systems, for example. In accordance with some exemplary embodiments, the transmission apparatus is thus an FMCW radar MIMO apparatus or a pulse radar MIMO apparatus.

A ring coupler can be understood within the context of the present disclosure to be an electrical RF subassembly that allows the sum or difference of/between two signals to be formed by means of interference. Constructive superposition (constructive interference) can therefore be understood to provide a summation of two RF signal components. Accordingly, destructive superposition (destructive interference) can be understood to provide a subtraction of two RF signal components. The function of a ring coupler can involve $\lambda/4$ line transformation, for example. The ring coupler can thus have a line length of $\lambda//4$ or multiples thereof between each connection of the ring coupler, where $\lambda/$signifies the wavelength of the RF signal.

The transmission apparatus further includes a first phase shifter, in order to vary the first phase of the first RF signal at the first RF signal connection between at least two discrete values (for example in the value range between 0 and $2\pi$). It is therefore also possible for different discrete phases to be set (from the first RF signal connection) at antenna connections with constructive superposition. Different transmission apparatuses and transmission antennas can therefore be distinguished on the basis of the phases of the RF transmission signals. For example, the ring coupler can be designed to take the first phase, which is set at the first phase shifter, of the first RF signal as a basis for causing RF transmission signals having different phases at different antenna connections of the ring coupler in accordance with a predetermined code (e.g. BPSK, QPSK, etc.).

In accordance with some exemplary embodiments, the ring coupler is designed to additionally cause, at each of (other) different antenna connections of the ring coupler, a destructive superposition of components of the first RF signal that propagate from the first RF signal connection to the respective antenna connections in different directions in the ring coupler. When there are four antenna connections, for example, the result is thus, from the first RF signal connection, constructive signal superpositions at two antenna connections and destructive signal superpositions at the other two antenna connections. Such implementation of the ring coupler can be advantageous for example if RF signals are coupled into the ring coupler via multiple connections. Further antennas can therefore be used for other RF signals.

In accordance with some exemplary embodiments, the ring coupler is designed to cause a constructive superposition of the components of the first RF signal that propagate from the first RF signal connection in different directions in the ring coupler at a first antenna connection of the ring coupler, to cause a destructive superposition of the components of the first RF signal that propagate from the first RF signal connection in different directions in the ring coupler at a second antenna connection of the ring coupler, to cause a constructive superposition of components of the first RF signal that propagate from the first RF signal connection in different directions in the ring coupler at a third antenna connection of the ring coupler, but with a different phase of the RF transmission signal than at the first antenna connection, and to cause a destructive superposition of the components of the first RF signal that propagate from the first RF signal connection in different directions in the ring coupler at a fourth antenna connection.

In accordance with some exemplary embodiments, the transmission apparatus further includes a second RF signal connection for a second RF signal having a second phase (different than the first phase). The ring coupler can then be designed to cause, at each of different antenna connections of the ring coupler, a superposition of components of the second RF signal that propagate from the second RF signal connection to the respective antenna connections in different directions in the ring coupler. The line lengths between the connections of the ring coupler are chosen such that RF transmission signals having different phases are obtained at the different antenna connections. It is thus possible for only two RF signal connections (e.g. MIMIC HF pins) and a plurality of antennas to be used to generate RF transmission signals having a multiplicity of different phases that can be distinguished by a receiver.

In accordance with some exemplary embodiments, the superposition of components of the second RF signal that propagate from the second RF signal connection to the respective antenna connections in different directions in the ring coupler is a constructive superposition.

In accordance with some exemplary embodiments, the ring coupler is designed to additionally cause, at each of (other) different antenna connections of the ring coupler, a destructive superposition of components of the second RF signal that propagate from the second RF signal connection to the respective antenna connections in different directions in the ring coupler. When there are four antenna connections, for example, the result is thus, from the second RF signal connection, constructive signal superpositions at two antenna connections and destructive signal superpositions at the other two antenna connections.

In accordance with some exemplary embodiments, the ring coupler is designed to cause the constructive superposition of the components of the first RF signal from the first RF signal connection at different antenna connections of the ring coupler than the constructive superposition of the components of the second RF signal from the second RF signal connection and/or to cause the destructive superposition of the components of the first RF signal from the first RF signal connection at different antenna connections of the ring coupler than the destructive superposition of the components of the second RF signal from the second RF signal connection. For example, the ring coupler can be designed to cause the destructive superposition of the components of the second RF signal from the second RF signal connection at the antenna connections at which the constructive superposition of the components of the first RF signal from the first RF signal connection takes place and to cause the constructive superposition of the components of the second RF signal from the second RF signal connection at the antenna connections at which the destructive superposition of the components of the first RF signal from the first RF signal connection takes place.

In accordance with some exemplary embodiments, the ring coupler is designed to cause a destructive superposition of the components of the RF signal that propagate from the second RF signal connection in different directions in the ring coupler at the first antenna connection of the ring coupler, to cause a constructive superposition of the components of the RF signal that propagate from the second RF signal connection in different directions in the ring coupler at the second antenna connection of the ring coupler, to cause a destructive superposition of components of the second RF signal that propagate from the second RF signal connection in different directions in the ring coupler at the third antenna connection of the ring coupler, and to cause a constructive superposition of the components of the second RF signal that propagate from the second RF signal connection in different directions in the ring coupler at the fourth antenna connection, but with a different phase of the RF transmission signal than at the second antenna connection.

In accordance with some exemplary embodiments, the transmission apparatus further includes a second phase shifter in order to vary the second phase of the second RF signal at the second RF signal connection between at least two discrete values. It is therefore also possible for different discrete phases to be set (from the second RF signal connection) at the antenna connections with constructive superposition. Different transmission apparatuses can therefore be distinguished on the basis of the phases of the RF transmission signals. For example, the ring coupler can be designed to take the second phase, which is set at the second phase shifter, of the second RF signal as a basis for causing RF signals having different phases at different antenna connections of the ring coupler in accordance with a predetermined code.

In accordance with some exemplary embodiments, at least one predetermined code is selectable, so that power is emitted via all of the plurality of antenna connections.

In accordance with some exemplary embodiments, furthermore at least one further predetermined code is selectable, so that power is emitted only via a subset of the plurality of antenna connections.

In accordance with a further aspect of the present disclosure, a MIMO transmission apparatus is proposed. The MIMO transmission apparatus includes a first RF signal connection having a first phase shifter for a first RF signal, which is derived from an RF signal, and a second RF signal connection having a second phase shifter for a second RF signal, which is derived from the RF signal. A control circuit is designed to set a phase of the first RF signal at the first RF signal connection and of the second RF signal at the second RF signal connection on the basis of predetermined MIMO codes. Further, the MIMO transmission apparatus includes a ring coupler having a plurality of antenna connections for coupling a plurality of antennas to the first and second RF signal connections. The ring coupler is designed to cause a superposition of components of the first RF signal that propagate from the first RF signal connection in different directions (e.g. clockwise, anticlockwise) in the ring coupler and components of the second RF signal that propagate from the second RF signal connection in different directions in the ring coupler at the antenna connections. In this case, RF transmission signals having different phases are obtained at different antenna connections from the plurality of antenna connections in accordance with the selected MIMO code on the basis of the phases, which are set at the first and second RF signal connections, of the first and second RF signals. As such, only two RF signal connections (e.g. MIMIC RF pins) and a plurality of antennas can be used to generate RF transmission signals having a multiplicity of different phases that can be distinguished by a receiver.

In accordance with some exemplary embodiments, the ring coupler has line lengths having a difference corresponding to an even-numbered multiple M (M=0, 2, 4, . . . ) of $\lambda/2$ for signal components that propagate from the first RF signal connection to a first antenna connection in different directions. For signal components that propagate from the first RF signal connection to a second antenna connection in different directions, the ring coupler can have different line lengths having a difference corresponding to an odd-numbered multiple N (N=1, 3, 5, . . . ) of $\lambda/2$. For signal components that propagate from the first RF signal connection to a third antenna connection in different directions, the ring coupler can have different line lengths having a difference corresponding to an even-numbered multiple of $\lambda/2$. For signal components that propagate from the first RF signal connection to a fourth antenna connection in different directions, the ring coupler can have different line lengths having a difference corresponding to an odd-numbered multiple of $\lambda/2$. For signal components that propagate from the second RF signal connection to the antenna connection in different directions, the ring coupler can have different line lengths having a difference corresponding to an odd-numbered multiple of $\lambda/2$. For signal components that propagate from the second RF connection to the second antenna connection in different directions, the ring coupler can have different line lengths having a difference corresponding to an even-numbered multiple of $\lambda/2$. For signal components that propagate from the second RF signal connection to the third antenna connection in different directions, the ring coupler can have different line lengths having a difference corresponding to an odd-numbered multiple of $\lambda//2$. For signal components that propagate from the second RF signal connection to the fourth antenna connection in different directions, the ring coupler can have different line lengths having a difference corresponding to an even-numbered multiple of $\lambda//2$. In this case, $\lambda/$signifies a wavelength of the RF signal.

In accordance with a further aspect, a motor vehicle having a transmission apparatus according to one of the preceding exemplary embodiments is proposed. In this case, the transmission apparatus can be designed to generate radar signals, for example FMCW (Frequency Modulated Continuous Wave) radar signals. The motor vehicle moreover includes a reception apparatus designed to receive reflected radar signals.

In accordance with yet a further aspect, a method for transmitting an RF transmission signal is proposed. In this case, a first RF signal connection is used to couple a first RF signal having a first phase into a ring coupler for coupling a plurality of antennas to the first RF signal connection. A second RF signal connection is used to couple a second RF signal having a second phase into the ring coupler. The ring coupler causes, at each of different antenna connections of the ring coupler, a superposition of signal components that propagate from the first RF signal connection to the respective antenna connections in different directions in the ring coupler and signal components that propagate from the second RF signal connection to the respective antenna connections in different directions in the ring coupler. This results in RF transmission signals having different phases at the different antenna connections.

In accordance with some exemplary embodiments, the method further includes varying the first phase of the first RF signal at the first RF signal connection between at least two discrete values, in order to take the set first phase as a basis for causing RF transmission signals having different phases at different antenna connections of the ring coupler in accordance with a MIMO code.

In accordance with some exemplary embodiments, the ring coupler causes, at each of different antenna connections of the ring coupler, a constructive superposition of components of the second RF signal that propagate from the second RF signal connection to the respective antenna connections in different directions in the ring coupler. In this case, the line lengths to different antenna connections are chosen such that RF transmission signals having different phases are obtained at the different antenna connections.

In accordance with some exemplary embodiments, the method further includes varying the second phase of the second RF signal at the second RF signal connection between at least two discrete values, in order to take the set second phase as a basis for causing RF transmission signals having different phases at different antenna connections of the ring coupler in accordance with a MIMO code.

In accordance with some exemplary embodiments, the ring coupler causes the constructive superposition of the components of the first RF signal at different antenna connections of the ring coupler than the constructive superposition of the components of the second RF signal and/or a destructive superposition of the components of the first RF signal at different antenna connections of the ring coupler than the destructive superposition of the components of the second RF signal.

The concept presented by means of the present disclosure uses the circumstance that not only are larger virtual MIMO antenna apertures generable with more physical RF signal connections (for example MMIC RF pins), it also merely comes down to illuminating (transmitter) or observing (receiver) the surroundings of spatially different locations as simultaneously as possible. This can be achieved with passive structures (ring couplers), which both split existing physical transmitters over multiple locations and at the same time impart a coding in order to be able to separate the contributions of the respective newly generated transmitter positions in the received signals. One possible advantage of such a concept is the increase in the angular resolution while hardware costs remain the same.

BRIEF DESCRIPTION OF THE DRAWINGS

A few examples of apparatuses and/or methods are explained in more detail merely in exemplary fashion below with reference to the accompanying figures, in which:

FIG. 3 shows a table with possible MIMO codes of the MIMO transmission apparatus shown in FIG. 2;

DETAILED DESCRIPTION

Various examples will now be described more thoroughly with reference to the accompanying figures, which depict a few examples. In the figures, the thicknesses of lines, layers and/or regions may be exaggerated for clarification purposes.

While further examples are suitable for various modifications and alternative forms, some specific examples thereof are correspondingly shown in the figures and are described thoroughly below. However, this detailed description does not restrict further examples to the specific forms described. Further examples can cover all modifications, counterparts and alternatives that fall within the scope of the disclosure. Throughout the description of the figures, identical or similar reference signs refer to identical or similar elements that can be implemented identically or in modified form in a comparison with one another, while they provide the same or a similar function.

It goes without saying that if one element is designated as "connected" or "coupled" to another element, the elements can be connected or coupled directly or via one or more intermediate elements. If two elements A and B are combined using an "or", this should be understood such that all possible combinations are disclosed, i.e. only A, only B, and A and B, unless explicitly or implicitly defined otherwise. An alternative wording for the same combinations is "at least one from A and B" or "A and/or B". The same applies, mutatis mutandis, to combinations of more than two elements.

The terminology used here to describe specific examples is not intended to have a limiting effect for further examples. When a singular form, e.g. "a, an" and "the" is used, and the use of only a single element is defined neither explicitly nor implicitly as obligatory, further examples can also use plural elements in order to implement the same function. If a function is described below as implemented using multiple elements, further examples can implement the same function using a single element or a single processing entity. Furthermore, it goes without saying that the terms "comprises", "comprising", "has" and/or "having" in their usage make more precise the presence of the indicated features, integers, steps, operations, processes, elements, components, and/or a group thereof, that do not exclude the presence or addition of one or more other features, integers, steps, operations, processes, elements, components and/or a group thereof.

Unless defined otherwise, all terms (including technical and scientific terms) are used here in their customary meaning in the field with which examples are associated.

Figure 1:
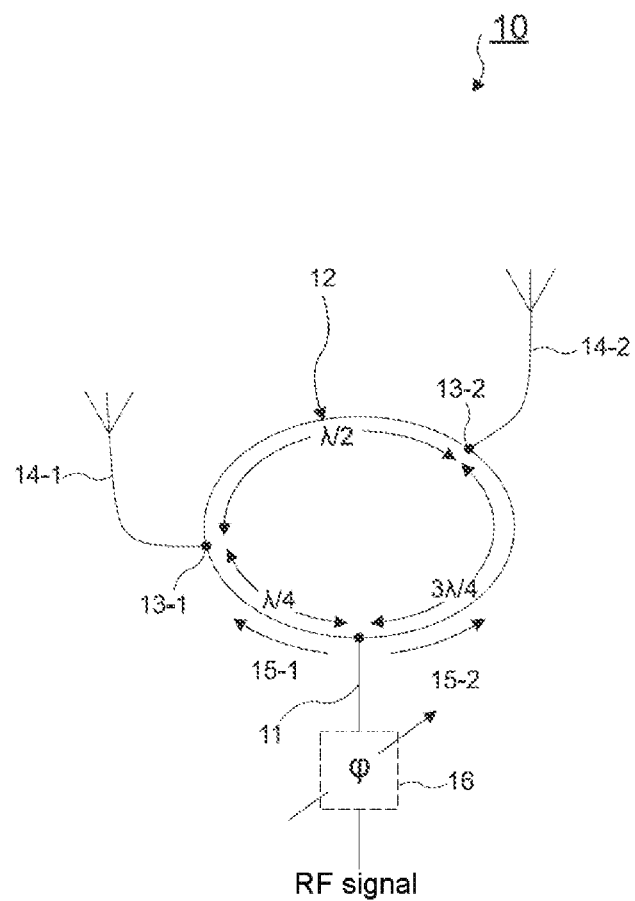
FIG. 1 shows a schematic depiction of a MIMO transmission apparatus in accordance with one exemplary embodiment.

FIG. 1 shows a schematic depiction of a transmission apparatus 10 in accordance with one exemplary embodiment.

The transmission apparatus 10 comprises at least one first RF signal connection 11 for an RF signal. Further, the transmission apparatus 10 comprises a ring coupler 12 having a plurality of antenna connections 13-1, 13-2 for coupling a plurality of antennas 14-1, 14-2 to the first RF signal connection 11. The ring coupler 12 is designed to cause, at each of different antenna connections 13-1, 13-2 of the ring coupler, a constructive superposition of components of the RF signal that propagate from the first RF signal connection 11 to the respective antenna connections 13-1, 13-2 in different directions 15-1, 15-2 (e.g. clockwise, anticlockwise) in the ring coupler. Line lengths of the ring coupler 12 from the first RF signal connection 11 to the different antenna connections 13-1, 13-2 are chosen in this case such that RF signals having different phases are obtained at the different antenna connections 13-1, 13-2 with constructive superposition.

Without restricting the generality, the transmission apparatus 10 can be used for MIMO radar systems having pulse radar signals or FMCW radar signals, for example, in particular in the motor vehicle sector. A frequency of the RF signal can therefore be in the GHz range, for example.

In the example shown in FIG. 1, a line length of the ring coupler 12 from the RF signal connection 11 clockwise to the first antenna connection 13-1 is $\lambda/4$. A line length of the ring coupler 12 from the RF signal connection 11 to the first antenna connection 13-1 anticlockwise is, in exemplary fashion, $5\lambda/4$, which means that the line lengths clockwise and anticlockwise differ by $\lambda$ in this case. This in turn leads to a phase difference of $2\pi$ in the RF signal components that propagate from the first RF signal connection 11 to the antenna connection 13-1 in different directions 15-1, 15-2 and hence to the constructive superposition of said RF signal components. A line length of the ring coupler 12 from the RF signal connection 11 clockwise to the second antenna connection 13-2 is, in exemplary fashion, $3\lambda/4$ in FIG. 1, just like the line length of the ring coupler 12 from the RF signal connection 11 to the second antenna connection 13-2 anticlockwise. As a result, the line lengths clockwise and anticlockwise are identical, which leads to a phase difference of 0 (no phase difference) and hence likewise to a constructive superposition of components of the RF signal that propagate from the first RF signal connection 11 to the antenna connection 13-2 in different directions 15-1, 15-2 in the ring coupler 12. It goes without saying that the line lengths between the connections of the ring coupler 12 are subject to manufacturing tolerances. Accordingly, constructive superposition also means an approximate doubling of the signal amplitude. Similarly, destructive superposition also means an approximate cancellation of the signals. Further, it goes without saying that, for an application for FMCW radar (Frequency Modulated Continuous Wave radar), the ring coupler can be designed for one of the frequencies in the frequency band, for example for the central frequency, as a result of which small differences in the phase differences can arise for the other frequencies.

A phase of $\varphi=0$ for the RF signal at the RF signal connection 11 results in an RF signal phase of $\pi/2$ at the first antenna connection 13-1, for example, whereas an RF signal phase of $3\pi/2$ or $-\pi/2$ is obtained at the second antenna connection 13-2. This corresponds for example to a phase modulation in accordance with a MIMO code having a value of e.g. "1" at the first antenna connection 13-1 and "0" at the second antenna connection 13-2. A phase of $\varphi=\pi$ for the RF signal at the RF signal connection 11 results in an RF signal phase of 0 at the first antenna connection 13-1, whereas an RF signal phase of $\pi$ is obtained at the second antenna connection 13-2. This then corresponds for example to a MIMO code of "0" at the first antenna connection 13-1 and "1" at the second antenna connection 13-2.

To set the phase of the RF signal at the RF signal connection 11, there can be an analogue and/or digital phase shifter 16 provided at the RF signal connection 11, in order to vary the phase of the RF signal at the RF signal connection 11 between at least two discrete values (e.g. $\varphi=0$, $\varphi=\pi$ or $\varphi=+\pi/2$, $\varphi=-\pi/2$). This can be done by means of a control circuit, for example, which is not explicitly shown. Appropriate design of the ring coupler 12 thus allows the phase, which is set at the phase shifter 16, of the RF signal to be taken as a basis for generating RF signals having different phases at the different antenna connections 13-1, 13-2 of the ring coupler in accordance with a predetermined MIMO code. To set the phases, there can be provision for a control circuit storing the phases that are to be set for a respective MIMO code. At specific times, the control circuit selects the phase to be set in accordance with the MIMO code provided at this time and transmits applicable phase information to the phase shifter 16, in order to set the phase for a predetermined period of time. At a subsequent time, the phase is changed, in order to select a further MIMO code, which differs from the preceding one.

It goes without saying that the transmission apparatus 10 of FIG. 1 must be understood only in exemplary fashion and that the number of antenna connections and/or the line lengths between connections can also be chosen differently. By way of example, there could also be four antennas present, which can then be rendered distinguishable by means of different phases of their emitted RF signals. The different phases of the RF signals can be produced by means of suitable implementation of the ring coupler 12 and of the line lengths between the connections.

Figure 2:
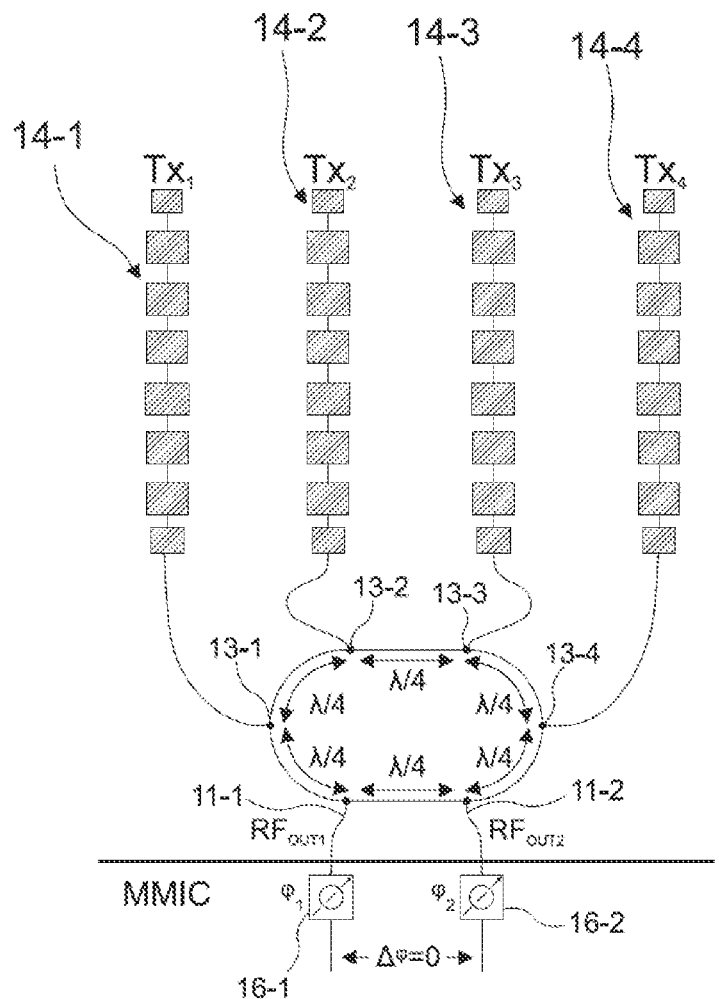
FIG. 2 shows a schematic depiction of a MIMO transmission apparatus in accordance with a further exemplary embodiment.

A transmission apparatus 20 in accordance with a further exemplary embodiment is shown schematically in FIG. 2.

The transmission apparatus 20 comprises a first RF signal connection 11-1 for a first RF signal having frequency f and a variable first phase $\varphi_1$ and a second RF signal connection 11-2 for a second RF signal having frequency f and a variable second phase $\varphi_2$. The first and second RF signals can be derived from an identical RF signal, for example an output signal of a local oscillator. The RF signals at the connections 11-1, 11-2 can thus differ merely in their phase, but have the same frequency fat an identical time. The frequency f can be in a frequency range around 24 GHz (K band), around 77 GHz or around 96 GHz (W band), for example, for radar applications. In the exemplary embodiment shown, the RF signal connections 11-1, 11-2 are coupled via the ring coupler 12 to four antenna connections 13-1 to 13-4, to which four antennas 14-1 to 14-4 can in turn be connected. In this case, the antennas 14-1 to 14-4 are shown in exemplary fashion as patch or panel antennas, which can easily be incorporated into printed circuit boards, for example.

The ring coupler 12 is designed, as shown in FIG. 2, to cause, at each of different antenna connections 13-1, 13-3 of the ring coupler, a superposition of components of the first RF signal and of the second RF signal that propagate from the first RF signal connection 11-1 to the respective antenna connections 13-1, 13-3 in different directions in the ring coupler. Line lengths from the first RF signal connection 11-1 to the antenna connections 13-1, 13-3 can be chosen such that constructively superposed first RF signals having different phases are obtained at each of the different antenna connections 13-1, 13-3 (from the first RF signal connection 11-1). The ring coupler 12 shown in FIG. 2 is further designed to cause, at each of other different antenna connections 13-2, 13-4 of the ring coupler, a constructive superposition of components of the second RF signal that propagate from the second RF signal connection 11-2 to the respective antenna connections 13-2, 13-4 in different directions in the ring coupler 12. Line lengths from the second RF signal connection 11-2 to the different antenna connections 13-2, 13-4 are chosen in this case such that RF signals having different phases are obtained (from the second RF signal connection 11-2) at the different antenna connections 13-2, 13-4 with constructive superposition.

In the example shown in FIG. 2, a line length of the ring coupler 12 from the first RF signal connection 11-1 clockwise to the first antenna connection 13-1 is $\lambda/4$. The line length between the antenna connections 13-1 and 13-2 is likewise $\lambda/4$, which means that the line length of the ring coupler 12 from the first RF signal connection 11-1 clockwise to the second antenna connection 13-2 is $\lambda/2$. The line length between the antenna connections 13-2 and 13-3 is $\lambda/4$, which means that the line length of the ring coupler 12 from the first RF signal connection 11-1 clockwise to the third antenna connection 13-3 is $3\lambda/4$. The line length between the antenna connections 13-3 and 13-4 is likewise $\lambda/4$, which means that the line length of the ring coupler 12 from the first RF signal connection 11-1 clockwise to the fourth antenna connection 13-4 is $\lambda$. The line length of the ring coupler between the two RF signal connections 11-1, 11-2 is $\lambda/4$. Viewed anticlockwise, the line length of the ring coupler 12 from the first RF signal connection 11-1 to the first antenna connection 13-1 is $5\lambda/4$, which means that in this case the line lengths clockwise and anticlockwise differ by $\lambda$ (constructive interference). Anticlockwise, the line length of the ring coupler 12 from the first RF signal connection 11-1 to the second antenna connection 13-2 is $\lambda$, which means that in this case the line lengths clockwise and anticlockwise differ by $\lambda/2$ (destructive interference). Anticlockwise, the line length of the ring coupler 12 from the first RF signal connection 11-1 to the third antenna connection 13-3 is $3\lambda/4$, which means that the line lengths clockwise and anticlockwise do not differ (constructive interference). Anticlockwise, the line length of the ring coupler 12 from the first RF signal connection 11-1 to the fourth antenna connection 13-4 is $\lambda/2$, which means that the line lengths clockwise and anticlockwise in this case differ by $\lambda/2$ (destructive interference).

In the example shown in FIG. 2, a line length of the ring coupler 12 from the second RF signal connection 11-2 clockwise to the first antenna connection 13-1 is $\lambda/2$. The line length of the ring coupler 12 from the second RF signal connection 11-2 clockwise to the second antenna connection 13-2 is $3\lambda/4$. The line length of the ring coupler 12 from the second RF signal connection 11-2 clockwise to the third antenna connection 13-3 is $\lambda$. The line length of the ring coupler 12 from the second RF signal connection 11-2 clockwise to the fourth antenna connection 13-4 is $5\lambda/4$. Viewed anticlockwise, the line length of the ring coupler 12 from the second RF signal connection 11-2 to the first antenna connection 13-1 is $\lambda$, which means that the line lengths clockwise and anticlockwise in this case differ by $\lambda/2$ (destructive interference). Anticlockwise, the line length of the ring coupler 12 from the second RF signal connection 11-2 to the second antenna connection 13-2 is $3\lambda/4$, which means that in this case the line lengths clockwise and anticlockwise do not differ (constructive interference). Anticlockwise, the line length of the ring coupler 12 from the second RF signal connection 11-2 to the third antenna connection 13-3 is $\lambda/2$, which means that the line lengths clockwise and anticlockwise differ by $\lambda/2$ (destructive interference). Anticlockwise, the line length of the ring coupler 12 from the second RF signal connection 11-2 to the fourth antenna connection 13-4 is $\lambda/4$, which means the line lengths clockwise and anticlockwise in this case differ by $\lambda$ (constructive interference).

The two RF signal connections 11-1, 11-2 can be e.g. MIMIC transmitter outputs, and the ring coupler 12 and the antennas 14-1 to 14-4 can be implemented on a printed circuit board. The phases of the MIMIC transmitter outputs 11-1, 11-2 are variable by means of respective phase shifters 16-1, 16-2. For the cited example, it is already sufficient if the phase is alterable ±180° per RF signal or frequency ramp, in order to split the existing MMIC transmitters over spatially different locations and at the same time to passively impart a preferably orthogonal code by means of special RF structures (ring coupler 12). In the example of FIG. 2, two physical RF pins can be used to realize a four-way transmitter CDMA MIMO radar. For this purpose, the two MIMIC RF pins 11-1, 11-2 are split over four transmission antennas $Tx_{1-4}$ by means of the ring coupler 12 and coded. The coding allows the contributions of the respective transmission antennas $Tx_{1-4}$ to a jointly received reflection signal to be separated. An advantage exists in the cost reduction, the simultaneous transmission by the transmission antennas $Tx_{1-4}$ and the automatic phase coding of the transmission signals.

Table 30 in FIG. 3 shows a possible coding of the transmission apparatus 20 that is obtained on the basis of different set phases of the MMIC pins $RF_{OUT1}$ and $RF_{OUT2}$ with the coupler structure 12 shown in FIG. 2. A phase denoted by "-" at a connection in FIG. 3 signifies that no RF signal is present or applied at the connection. Further output codes are possible by completely disconnecting individual MMIC $RF_{OUT1}$ and $RF_{OUT2}$ pins. Interestingly, the emitted power for the coupler structure 12 remains the same for all codes. If only biphase modulation (BPSK) of the antennas $Tx_{1-4}$ is of interest, it is possible for e.g. the codes marked by arrows to be used. These codes consist both of codes for which the phases are set such that power is emitted via each of the antennas and of codes for which the phases are set such that power is emitted only via a subset of the antennas (two antennas in the example). In order to achieve better separation of the antennas $Tx_{1-4}$, it is also possible for the remaining codes to be used, however.

It should be noted that exemplary embodiments are not restricted to a planar design comprising microstrip and patch antennas. Similarly, slot antennas and waveguide directional-coupler structures are possible, for example. In addition, it is also possible for other coupler structures to be used, for example in order to produce more than four transmitters or other code sequences. The proposed structures can also be incorporated into an MMIC, for example.

Figure 4:
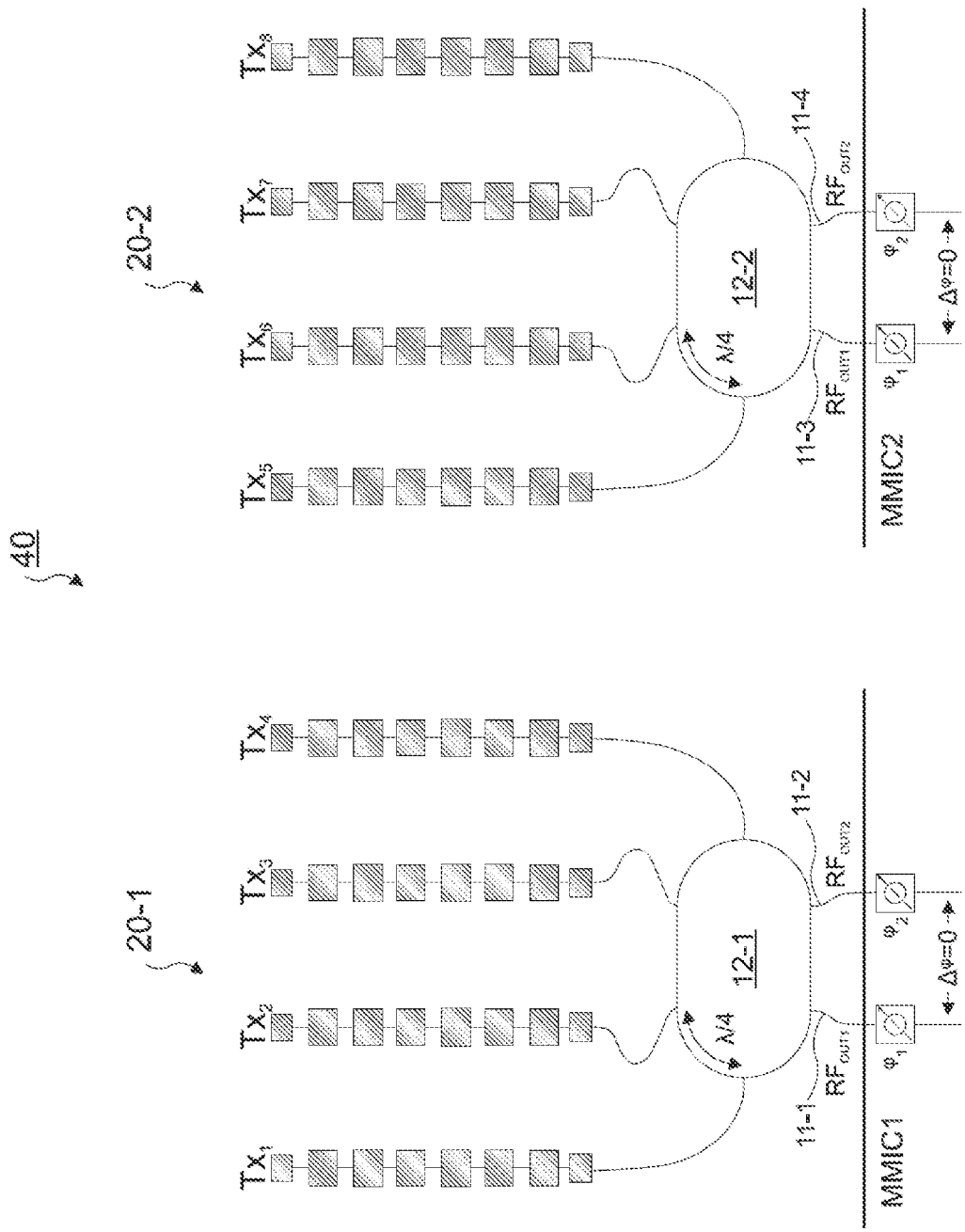
FIG. 4 shows a schematic depiction of a MIMO transmission apparatus in accordance with yet a further exemplary embodiment.

An even larger number of codes in comparison with FIG. 3 can be achieved with the transmission apparatus 40 of FIG. 4, for example, which comprises two cascaded transmission apparatuses 20-1, 20-2 as shown in FIG. 2. In this example, eight transmission antennas $Tx_{1-8}$ can be used to use numerous different codes. In the example of FIG. 4, four physical RF pins can be used to realize an 8-way transmitter CDMA MIMO radar. For this purpose, the four MMIC RF pins 11-1 to 11-4 are split over eight transmission antennas $Tx_{1-8}$ by means of two ring couplers 12-1, 12-2 and coded.

Figure 5:
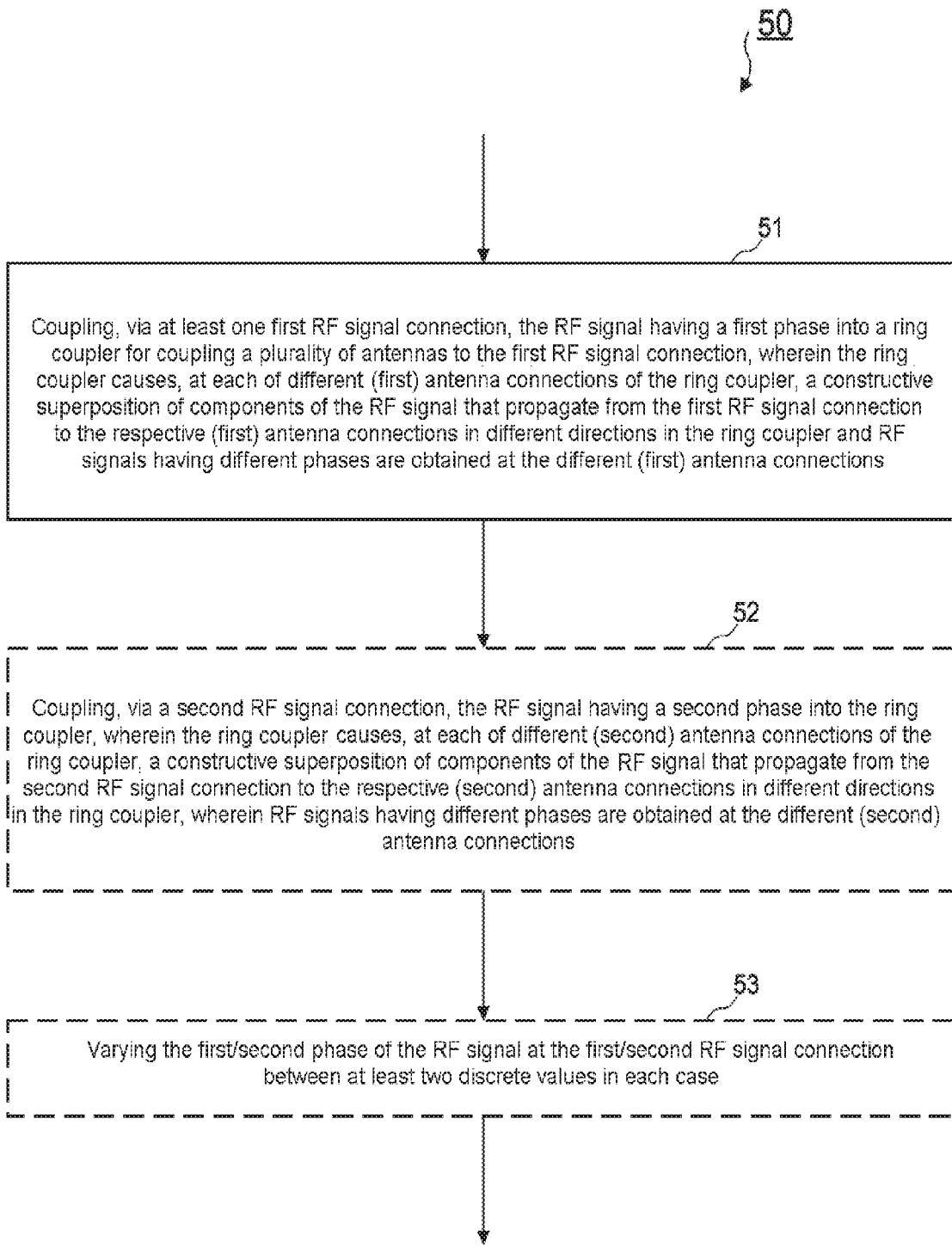
FIG. 5 shows a flowchart for a MIMO transmission method in accordance with one exemplary embodiment.

In summary, FIG. 5 depicts a method 50 for transmitting an RF signal.

The method 50 comprises coupling 51 the RF signal having a first phase (pi into a ring coupler 12 at at least one first RF signal connection 11-1. The ring coupler is used to couple a plurality of antennas 14-1, 14-2 to the first RF signal connection 11-1. The ring coupler 12 causes, at each of a first selection of different antenna connections of the ring coupler, a constructive superposition of components of the RF signal that propagate from the first RF signal connection 11 to the respective antenna connections in different directions in the ring coupler 12. In this case, different line lengths mean that RF signals having different phases are obtained at the different antenna connections of the first selection.

Optionally, the method 50 also comprises coupling 52 the RF signal having a second phase $\varphi_2$ into the ring coupler 12, via a second RF signal connection 11-2, wherein the ring coupler causes, at each of a second selection of different antenna connections 13-2, 13-4 of the ring coupler, a constructive superposition of components of the RF signal that propagate from the second RF signal connection to the respective antenna connections in different directions in the ring coupler. In this case, different line lengths mean that RF signals having different phases are obtained at the different antenna connections of the second selection.

Furthermore, the first phase $\varphi_1$ and/or the second phase $\varphi_2$ of the RF signal at the first/second RF signal connection can be varied between at least two discrete values, in order to take the respective set phase $\varphi_1/\varphi_2$ as a basis for causing the RF signal having different phases at different antenna connections of the ring coupler in accordance with a binary code.

The aspects and features described together with one or more of the previously detailed examples and figures can also be combined with one or more of the other examples in order to replace an identical feature of the other example or in order to additionally introduce the feature into the other example.

The description and drawings present only the principles of the disclosure. Furthermore, all examples mentioned here are intended to be used expressly only for illustrative purposes, in order to assist the reader in understanding the principles of the disclosure and the concepts contributed by the inventor(s) for further development of the art. All statements herein regarding principles, aspects and examples of the disclosure and also concrete examples thereof encompass the counterparts thereof.

A function block designated as "means for . . . " carrying out a specific function can relate to a circuit configured for carrying out a specific function. Consequently, a "means for something" can be implemented as a "means configured for or suitable for something", e.g. a component or a circuit configured for or suitable for the respective task.

It goes without saying that the disclosure of multiple steps, processes, operations or functions disclosed in the description or the claims should not be interpreted as being in the specific order, unless this is explicitly or implicitly indicated otherwise, e.g. for technical reasons. The disclosure of multiple steps or functions therefore does not limit them to a specific order, unless said steps or functions are not interchangeable for technical reasons. Further, in some examples, an individual step, function, process or operation can include multiple partial steps, functions, processes or operations and/or be subdivided into them. Such partial steps can be included and can be part of the disclosure of said individual step, provided that they are not explicitly excluded.

Furthermore, the claims that follow are hereby incorporated in the detailed description, where each claim can be representative of a separate example by itself. While each claim can be representative of a separate example by itself, it should be taken into consideration that—although a dependent claim can refer in the claims to a specific combination with one or more other claims—other examples can also encompass a combination of the dependent claim with the subject matter of any other dependent or independent claim. Such combinations are explicitly proposed here, provided that no indication is given that a specific combination is not intended. Further, features of a claim are also intended to be included for any other independent claim, even if this claim is not made directly dependent on the independent claim.

What is claimed is:

1. A transmission apparatus, comprising:
   a first radio frequency (RF) signal connection configured to provide a first RF signal having a first phase;
   a ring coupler having a first plurality of antenna connections configured to couple a first plurality of antennas to the first RF signal connection, wherein the ring coupler is configured to split the first RF signal into a first component that propagates in the ring coupler from the first RF signal connection in a clockwise direction and a second component that propagates in the ring coupler from the first RF signal connection in a counterclockwise direction, wherein the ring coupler is configured to cause, at each of the first plurality of antenna connections of the ring coupler, a superposition of the first component of the first RF signal and the second component of the first RF signal, wherein first RF transmission signals having different phases are obtained from the first RF signal at each of the first plurality of antenna connections;

a first phase shifter configured to set the first phase of the first RF signal and to vary the first phase of the first RF signal at the first RF signal connection between at least two discrete values in order to use the first phase as a basis for causing the first RF transmission signals to have the different phases at the first plurality of antenna connections of the ring coupler in accordance with a first predetermined phase modulation code; and a second RF signal connection configured to provide a second RF signal having a second phase, wherein the ring coupler comprises a second plurality of antenna connections configured to couple a second plurality of antennas to the second RF signal connection, wherein the ring coupler is configured to split the second RF signal into a first component that propagates in the ring coupler from the second RF signal connection in a clockwise direction and a second component that propagates in the ring coupler from the second RF signal connection in a counterclockwise direction, wherein the ring coupler is configured to cause, at each of the second plurality of antenna connections of the ring coupler, a superposition of the first component of the second RF signal and the second component of the second RF signal, wherein second RF transmission signals having different phases are obtained from the second RF signal at the second plurality of antenna connections, wherein the ring coupler is configured to cause a constructive superposition of the first and the second components of the first RF signal at of the first plurality of antenna connections and to cause a constructive superposition of the first and the second components of the second RF signal at the second plurality of antenna connections, wherein the first plurality of antenna connections and the second plurality of antenna connections are mutually exclusive of each other, and wherein the ring coupler is configured to cause a destructive superposition of the first and the second components of the first RF signal at the second plurality of antenna connections and to cause a destructive superposition of the first and the second components of the second RF signal at the first plurality of antenna connections.

2. The transmission apparatus as claimed in claim 1, further comprising:

a second phase shifter configured to set the second phase of the second RF signal and to vary the second phase of the RF signal at the second RF signal connection between at least two discrete values in order to use the second phase as a basis for causing the second RF transmission signals to have the different phases at the second plurality of antenna connections of the ring coupler in accordance with a second predetermined phase modulation code.

3. The transmission apparatus as claimed in claim 2, wherein the first and the second predetermined phase modulation codes are selectable from a plurality of predetermined phase modulation codes so that power is emitted via all of the first plurality of antenna connections and the second plurality of antenna connections.

4. The transmission apparatus as claimed in claim 2, wherein the first and the second predetermined phase modulation codes are selectable from a plurality of predetermined phase modulation codes so that power is emitted only via a subset of the first plurality of antenna connections and the second plurality of antenna connections.

5. The transmission apparatus as claimed in claim 1, wherein the ring coupler has a line length of $\lambda/4$ between each antenna connection of the ring coupler, where $\lambda$ signifies a wavelength of the first RF signal.

6. The transmission apparatus as claimed in claim 1, wherein the transmission apparatus is a frequency-modulated continuous-wave (FMCW) radar Multiple-Input Multiple-Output (MIMO) apparatus or a pulse radar MIMO apparatus.

7. A multiple-input multiple-output (MIMO) transmission apparatus, comprising:

a first radio frequency (RF) signal connection having a first phase shifter configured to provide a first RF signal, which is derived from an RF signal;

a second RF signal connection having a second phase shifter configured to provide a second RF signal, which is derived from the RF signal;

a control circuit configured to set a first phase of the first RF signal at the first RF signal connection and to set a second phase of the second RF signal at the second RF signal connection on the basis of predetermined MIMO codes; and a ring coupler having a first plurality of antenna connections configured to couple a first plurality of antennas to the first RF signal connection, wherein the ring coupler is configured to split the first RF signal into a first component that propagates in the ring coupler from the first RF signal connection in a clockwise direction and a second component that propagates in the ring coupler from the first RF signal connection in a counterclockwise direction, wherein the ring coupler is configured to cause, at each of the first plurality of antenna connections of the ring coupler, a superposition of the first component of the first RF signal and the second component of the first RF signal, wherein first RF transmission signals having different phases are obtained from the first RF signal at each of the first plurality of antenna connections in accordance with a first selected MIMO code on a basis of the first phase of the first RF signal;

wherein the ring coupler comprises a second plurality of antenna connections configured to couple a second plurality of antennas to the second RF signal connection, wherein the ring coupler is configured to split the second RF signal into a first component that propagates in the ring coupler from the second RF signal connection in a clockwise direction and a second component that propagates in the ring coupler from the second RF signal connection in a counterclockwise direction, wherein the ring coupler is configured to cause, at each of the second plurality of antenna connections of the ring coupler, a superposition of the first component of the second RF signal and the second component of the second RF signal, wherein second RF transmission signals having different phases are obtained from the second RF signal at the second plurality of antenna connections in accordance with a second selected MIMO code on a basis of the second phase of the second RF signal, wherein the ring coupler is configured to cause a constructive superposition of the first and the second components of the first RF signal at of the first plurality of antenna connections and to cause a constructive superposition of the first and the second components of the second RF signal at the second plurality of antenna connections, wherein the first plurality of antenna connections and the second plurality of antenna connections are mutually exclusive of each other, and wherein the ring coupler is configured to cause a destructive superposition of the first and the second components of the first RF signal at the second plurality of antenna connections and to cause a destructive superposition of the first and the second components of the second RF signal at the first plurality of antenna connections.

8. The MIMO transmission apparatus as claimed in claim 7, wherein:

the ring coupler has different line lengths having a difference corresponding to an even-numbered multiple of $\lambda/2$ for the first and the second signal components of the first RF signal that propagate from the first RF signal connection to a first antenna connection in different directions, the ring coupler has different line lengths having a difference corresponding to an odd-numbered multiple of $\lambda/2$ for the first and the second signal components of the first RF signal that propagate from the first RF signal connection to a second antenna connection in different directions, the ring coupler has different line lengths having a difference corresponding to an even-numbered multiple of $\lambda/2$ for the first and the second signal components of the first RF signal that propagate from the first RF signal connection to a third antenna connection in different directions, and the ring coupler has different line lengths having a difference corresponding to an odd-numbered multiple of $\lambda/2$ for the first and the second signal components of the first RF signal that propagate from the first RF signal connection to a fourth antenna connection in different directions, where $\lambda$ signifies a wavelength of the RF signal.

9. The MIMO transmission apparatus as claimed in claim 8, wherein:

the ring coupler has different line lengths having a difference corresponding to an odd-numbered multiple of $\lambda/2$ for the first and the second signal components of the second RF signal that propagate from the second RF signal connection to the first antenna connection in different directions, the ring coupler has different line lengths having a difference corresponding to an even-numbered multiple of $\lambda/2$ for the first and the second signal components of the second RF signal that propagate from the second RF signal connection to the second antenna connection in different directions, the ring coupler has different line lengths having a difference corresponding to an odd-numbered multiple of $\lambda/2$ for the first and the second signal components of the second RF signal that propagate from the second RF signal connection to the third antenna connection in different directions, and the ring coupler has different line lengths having a difference corresponding to an even-numbered multiple of $\lambda/2$ for the first and the second signal components of the second RF signal that propagate from the second RF signal connection to the fourth antenna connection in different directions.

10. A motor vehicle, comprising:

a transmission apparatus configured to generate radar signals; and a reception apparatus configured to receive reflected radar signals, wherein the transmission apparatus comprises:

a first radio frequency (RF) signal connection configured to provide a first RF signal having a first phase;

a ring coupler having a first plurality of antenna connections configured to couple a first plurality of antennas to the first RF signal connection, wherein the ring coupler is configured to split the first RF signal into a first component that propagates in the ring coupler from the first RF signal connection in a clockwise direction and a second component that propagates in the ring coupler from the first RF signal connection in a counterclockwise direction, wherein the ring coupler is configured to cause, at each of the first plurality of antenna connections of the ring coupler, a superposition of the first component of the first RF signal and the second component of the first RF signal, wherein first RF transmission signals having different phases are obtained from the first RF signal at each of the first plurality of antenna connections;

a first phase shifter configured to set the first phase of the first RF signal and to vary the first phase of the first RF signal at the first RF signal connection between at least two discrete values in order to use the first phase as a basis for causing the first RF transmission signals to have the different phases at the first plurality of antenna connections of the ring coupler in accordance with a first predetermined phase modulation code; and a second RF signal connection configured to provide a second RF signal having a second phase, wherein the ring coupler comprises a second plurality of antenna connections configured to couple a second plurality of antennas to the second RF signal connection, wherein the ring coupler is configured to split the second RF signal into a first component that propagates in the ring coupler from the second RF signal connection in a clockwise direction and a second component that propagates in the ring coupler from the second RF signal connection in a counterclockwise direction, wherein the ring coupler is configured to cause, at each of the second plurality of antenna connections of the ring coupler, a superposition of the first component of the second RF signal and the second component of the second RF signal, wherein second RF transmission signals having different phases are obtained from the second RF signal at the second plurality of antenna connections, wherein the ring coupler is configured to cause a constructive superposition of the first and the second components of the first RF signal at of the first plurality of antenna connections and to cause a constructive superposition of the first and the second components of the second RF signal at the second plurality of antenna connections, wherein the first plurality of antenna connections and the second plurality of antenna connections are mutually exclusive of each other, and wherein the ring coupler is configured to cause a destructive superposition of the first and the second components of the first RF signal at the second plurality of antenna connections and to cause a destructive superposition of the first and the second components of the second RF signal at the first plurality of antenna connections.

11. A motor vehicle, comprising:
a transmission apparatus configured to generate radar signals; and
a reception apparatus configured to receive reflected radar signals,
wherein the transmission apparatus comprises:
a first radio frequency (RF) signal connection having a first phase shifter configured to provide a first RF signal, which is derived from an RF signal;
a second RF signal connection having a second phase shifter configured to provide a second RF signal, which is derived from the RF signal;
a control circuit configured to set a first phase of the first RF signal at the first RF signal connection and to set a second phase of the second RF signal at the second RF signal connection on the basis of predetermined multiple-input multiple-output (MIMO) codes; and
a ring coupler having a first plurality of antenna connections configured to couple a first plurality of antennas to the first RF signal connection, wherein the ring coupler is configured to split the first RF signal into a first component that propagates in the ring coupler from the first RF signal connection in a clockwise direction and a second component that propagates in the ring coupler from the first RF signal connection in a counterclockwise direction, wherein the ring coupler is configured to cause, at each of the first plurality of antenna connections of the ring coupler, a superposition of the first component of the first RF signal and the second component of the first RF signal, wherein first RF transmission signals having different phases are obtained from the first RF signal at each of the first plurality of antenna connections in accordance with a first selected MIMO code on a basis of the first phase of the first RF signal;
wherein the ring coupler comprises a second plurality of antenna connections configured to couple a second plurality of antennas to the second RF signal connection, wherein the ring coupler is configured to split the second RF signal into a first component that propagates in the ring coupler from the second RF signal connection in a clockwise direction and a second component that propagates in the ring coupler from the second RF signal connection in a counterclockwise direction, wherein the ring coupler is configured to cause, at each of the second plurality of antenna connections of the ring coupler, a superposition of the first component of the second RF signal and the second component of the second RF signal, wherein second RF transmission signals having different phases are obtained from the second RF signal at the second plurality of antenna connections in accordance with a second selected MIMO code on a basis of the second phase of the second RF signal,
wherein the ring coupler is configured to cause a constructive superposition of the first and the second components of the first RF signal at of the first plurality of antenna connections and to cause a constructive superposition of the first and the second components of the second RF signal at the second plurality of antenna connections, wherein the first plurality of antenna connections and the second plurality of antenna connections are mutually exclusive of each other, and
wherein the ring coupler is configured to cause a destructive superposition of the first and the second components of the first RF signal at the second plurality of antenna connections and to cause a destructive superposition of the first and the second components of the second RF signal at the first plurality of antenna connections.

12. A method for transmitting a radio frequency (RF) transmission signal, the method comprising:
coupling, via a first RF signal connection, a first RF signal having a first phase into a ring coupler for coupling a first plurality of antennas and a second plurality of antennas to the first RF signal connection and;
coupling, via a second RF signal connection, a second RF signal having a second phase into the ring coupler for coupling the first plurality of antennas and the second plurality of antenna to the second RF signal connection;
splitting by the ring coupler the first RF signal into a first component that propagates in the ring coupler from the first RF signal connection in a clockwise direction and a second component that propagates in the ring coupler from the first RF signal connection in a counterclockwise direction;
splitting by the ring coupler the second RF signal into a first component that propagates in the ring coupler from the second RF signal connection in a clockwise direction and a second component that propagates in the ring coupler from the second RF signal connection in a counterclockwise direction;
inducing by the ring coupler, at each of the first plurality of antenna connections of the ring coupler, a superposition of the first component of the first RF signal and the second component of the first RF signal, wherein first RF transmission signals having different phases are obtained from the first RF signal at each of the first plurality of antenna connections in accordance with a first selected multiple-input multiple-output (MIMO) code on a basis of the first phase of the first RF signal; and
inducing by the ring coupler, at each of the second plurality of antenna connections of the ring coupler, a superposition of the first component of the second RF signal and the second component of the second RF signal, wherein second RF transmission signals having different phases are obtained from the second RF signal at the second plurality of antenna connections in accordance with a second selected MIMO code on a basis of the second phase of the second RF signal,
wherein the ring coupler is configured to cause a constructive superposition of the first and the second components of the first RF signal at of the first plurality of antenna connections and to cause a constructive superposition of the first and the second components of the second RF signal at the second plurality of antenna connections, wherein the first plurality of antenna connections and the second plurality of antenna connections are mutually exclusive of each other, and
wherein the ring coupler is configured to cause a destructive superposition of the first and the second components of the first RF signal at the second plurality of antenna connections and to cause a destructive superposition of the first and the second components of the second RF signal at the first plurality of antenna connections.

13. The method as claimed in claim 12, further comprising:
- varying the first phase of the first RF signal at the first RF signal connection between at least two discrete values, in order to use the first phase as a basis for causing the first RF transmission signals to have different phases at the first plurality of antenna connections of the ring coupler in accordance with the first selected MIMO code.

14. The method as claimed in claim 13, further comprising:
- varying the second phase of the second RF signal at the second RF signal connection between at least two discrete values, in order to use the second phase as a basis for causing the second RF transmission signals to have different phases at the second plurality of antenna connections of the ring coupler in accordance with the second selected MIMO code.

\* \* \* \* \*